US008761335B2

(12) United States Patent
Ishkhanov et al.

(10) Patent No.: US 8,761,335 B2
(45) Date of Patent: Jun. 24, 2014

(54) MULTI-ENERGY CARGO INSPECTION SYSTEM BASED ON AN ELECTRON ACCELERATOR

(75) Inventors: Boris Sarkisovich Ishkhanov, Moscow (RU); Vasiliy Ivanovich Shvedunov, Moscow (RU); Nikoliy Ivanovich Pakhomov, Moscow (RU); Sergey Mikhailovich Varzar, Moscow (RU)

(73) Assignee: Hazardscan, Inc., Pepper Pike, OH (US)

( * ) Notice: Subject to any disclaimer, the term of this patent is extended or adjusted under 35 U.S.C. 154(b) by 1227 days.

(21) Appl. No.: 12/088,707

(22) PCT Filed: Oct. 2, 2006

(86) PCT No.: PCT/US2006/038495

§ 371 (c)(1),
(2), (4) Date: Mar. 31, 2008

(87) PCT Pub. No.: WO2008/048246

PCT Pub. Date: Apr. 24, 2008

(65) Prior Publication Data

US 2010/0195791 A1 Aug. 5, 2010

Related U.S. Application Data

(60) Provisional application No. 60/596,522, filed on Sep. 30, 2005.

(51) Int. Cl.
*G01N 23/04* (2006.01)
*H05H 7/12* (2006.01)
*H05H 13/10* (2006.01)

(52) U.S. Cl.
CPC *H05H 13/10* (2013.01); *H05H 7/12* (2013.01)
USPC .............................................. 378/57; 378/119

(58) Field of Classification Search
USPC .............................................. 378/57, 119, 138
See application file for complete search history.

(56) References Cited

U.S. PATENT DOCUMENTS 6,777,692 B2 * 8/2004 Jongen ........................ 250/492.1
6,937,692 B2 * 8/2005 Johnson et al. ................. 378/57
2002/0008450 A1 * 1/2002 Tanaka .............................. 313/1
2004/0013233 A1 * 1/2004 Yamada et al. .............. 378/98.8
2005/0178977 A1 * 8/2005 Koenck et al. ........... 250/455.11

* cited by examiner

*Primary Examiner* — Hoon Song
(74) *Attorney, Agent, or Firm* — Rankin, Hill & Clark LLP

(57) ABSTRACT

A multi-energy cargo inspection system features a compact electron accelerator is used that is more compact, more efficient and less expensive than a single linear accelerator with the same energy. The system has enhanced capabilities to recognize the elemental content of a container which can be used to detect concealed explosive and fissionable materials.

9 Claims, 7 Drawing Sheets

MULTI-ENERGY CARGO INSPECTION SYSTEM BASED ON AN ELECTRON ACCELERATOR

FIELD OF INVENTION

The present invention relates to a cargo inspection system, and more particularly to a cargo inspection system using an electron accelerator with enhanced capabilities to recognize the elemental content of a cargo container.

BACKGROUND OF THE INVENTION

Due to the increasing attention to terrorist activities, there has been increased interest in providing more effective and more efficient systems for inspecting cargo at points of entry and to identify contraband, particularly explosive and fissionable material. While the smuggling of contraband onto planes in carry-on bags and in luggage has been a well-known, on-going concern, a less publicized but also serious threat is the smuggling of contraband across borders and by boat in large cargo containers.

The development of systems for large container content control has gone in two different directions.

1. The first direction is a follow-on to X-ray machines, with high-energy (2.5 to 9 MeV) radio frequency (RF) electron linear accelerators (linac) generating bremsstrahlung radiation.

In an RF linac, an electromagnetic wave is used to accelerate charged particles. There are two types of RF linac: traveling wave and standing wave. The traveling wave linac is a circular waveguide with diaphragms which slow the speed of the wave down to the speed of particles being accelerated. The speed of electrons with energy above 0.5 MeV is about speed of light. The standing wave linac is a chain of coupled cavities with the length of each close to half the wavelength of electromagnetic wave. Most electron RF linacs operate at a wavelength of 10 to 10.5 cm (i.e., a frequency of 2998 to 2856 MHz), and this wavelength band is named S-band. To accelerate the electron beam to 10 MeV in a traveling wave linac, its length must be 2.2 to 2.5 m, and it is necessary to install a solenoid above the waveguide for particle focusing. The standing wave linac for the same beam energy is about two times shorter and does not require the focusing solenoid; however, the RF source must be protected from reflected wave by the high power circulator. In both types of linacs, to produce an accelerating field, 2.5 to 3 MW of pulsed RF power must be spent, and about 1 to 1.5 MW RF power will be transferred to the beam, so the total RF power necessary for a cargo inspection linac is 3.5 to 4.5 MW. By decreasing the length of the electromagnetic wave, e.g., going to C-band (5.5 to 25 cm), the linac length and the RF power required to produce an accelerating field are decreased, approximately 2 and 1.5 times respectively.

The RF linac generates bremsstrahlung radiation. Bremsstrahlung (or braking radiation) is produced when electrons hit the so-called bremsstrahlung target. To generate the maximum number of photons, the target is made of a heavy element material with high melting temperature, e.g., tungsten or tantalum, with a thickness 1.5 to 2 mm. At 10 MeV, 8 to 10% of the electron energy is transformed to the energy of the X-ray radiation. The energy spectrum of the generated X-ray radiation is continuous, with the end-point energy equal to the electron energy and the number of photons increasing with the decrease in energy. The X-ray energy spectrum can be hardened using so-called energy filters—a light element absorber installed after the bremsstrahlung target.

A 2.5 to 9 MeV RF linac generating bremsstrahlung radiation permits detection of the variation of the high energy X-ray absorption or scattering factor across the container area and thus reconstructing an image of the container's contents. Currently, more than one hundred systems based on this technique are installed, mainly at seaports, worldwide and are used to detect contraband.

2. The second direction is based on more complicated processes, including nuclear processes—slow and fast neutron capture and scattering, high-energy monochromatic X-ray absorption, photonuclear reactions, and delayed neutron registration. Methods being developed do not aim to reconstruct details of the container content, but rather to produce an alarm signal if explosive or fissionable material is present in the container. Although early installations based on slow neutron capture were developed and installed at airports in 1980s, no commercial product currently is capable of operating with low levels of false alarms and high output. The main reasons for that are the low cross-section (probability) of the nuclear reactions, resulting in low levels of response signal; the absence of the probing particle sources with appropriate parameters; and the limited capabilities of the particle detectors.

In most cargo inspection systems operating over the world (except some Chinese systems), the installation is a system based on the first direction discussed above using a machine marketed as Lintron-M, made by Varian Medical Systems. This machine was initially developed for medicine and defectoscopy and has been widely used for many years. It is produced in variants with different fixed electron beam energies of 1.9, 3, 6, and 9 MeV. The size and weight parameters for the 9 MeV machine are:

| | Height (cm) | Width (cm) | Length (cm) | Weight (kg) |
|---|---|---|---|---|
| Accelerating head | 64 | 30 | 142 | 150 |
| Modulator | 122 | 92 | 76 | 150 |
| RF source | 34 | 61 | 107 | 136 |
| Cooling/thermoregulating | 51 | 71 | 62 | 75 |
| Control | 18 | 48 | 30 | 10 |

As can be seen from the first row of this table, the volume occupied by the Linatron-M accelerating head is 6.4 m 3.0 m 14.2 m=273 $m^3$. The Linatron-M producing a 9 MeV beam requires about 5 MW klystron.

Recently, a development of the first direction has been proposed in which two different energy electron linacs, operating in alternation, would generate two end point energy bremsstrahlung X-ray radiation illuminating the same part of the container. The different dependence of the X-ray absorption or scattering cross-section on energy for different elements is the basis for recognition of the light or heavy elements content anomaly, e.g., nitrogen in explosives or plutonium in fissionable materials.

SUMMARY OF INVENTION

This present invention provides a further development in the first direction discussed above in which two different energy electron linacs, operating in alternation, have been used to generate two end point energy bremsstrahlung X-ray radiation illuminating the same part of the container. In accordance with the present invention, a unique design for an electron accelerator permits energy to be varied beyond the two different levels previously used.

The electron accelerator of the present invention is used to generate a beam in which the energy can be varied in four different steps within 4 to 10 MeV with approximately 1000 Hz repetition frequency. The present invention thus uses a multi-energy technique to detect the presence of contraband in cargo inspection.

In accordance with the present invention, a unique linear accelerator is used that is more compact, more efficient and less expensive than a single linac with the same energy. At the same time, the linear accelerator of the present invention replaces four linacs, so the X-ray source built with the accelerator is about one order of magnitude less expensive than an equivalent linac-based source. Using multiple end point energies instead of one or two greatly enhances elemental recognition capabilities.

A multi-energy cargo inspection system of the present invention has enhanced capabilities to recognize the elemental content of a container moving at a velocity of about 0.5 m/s, and can be used to detect concealed explosive and fissionable materials.

These and other advantages are provided by the present invention of a cargo inspection system which comprises a compact multi-energy electron accelerator comprising a race-track microtron having a maximum electron energy of 10 MeV.

DETAILED DESCRIPTION OF PREFERRED EMBODIMENTS

Figure 1:
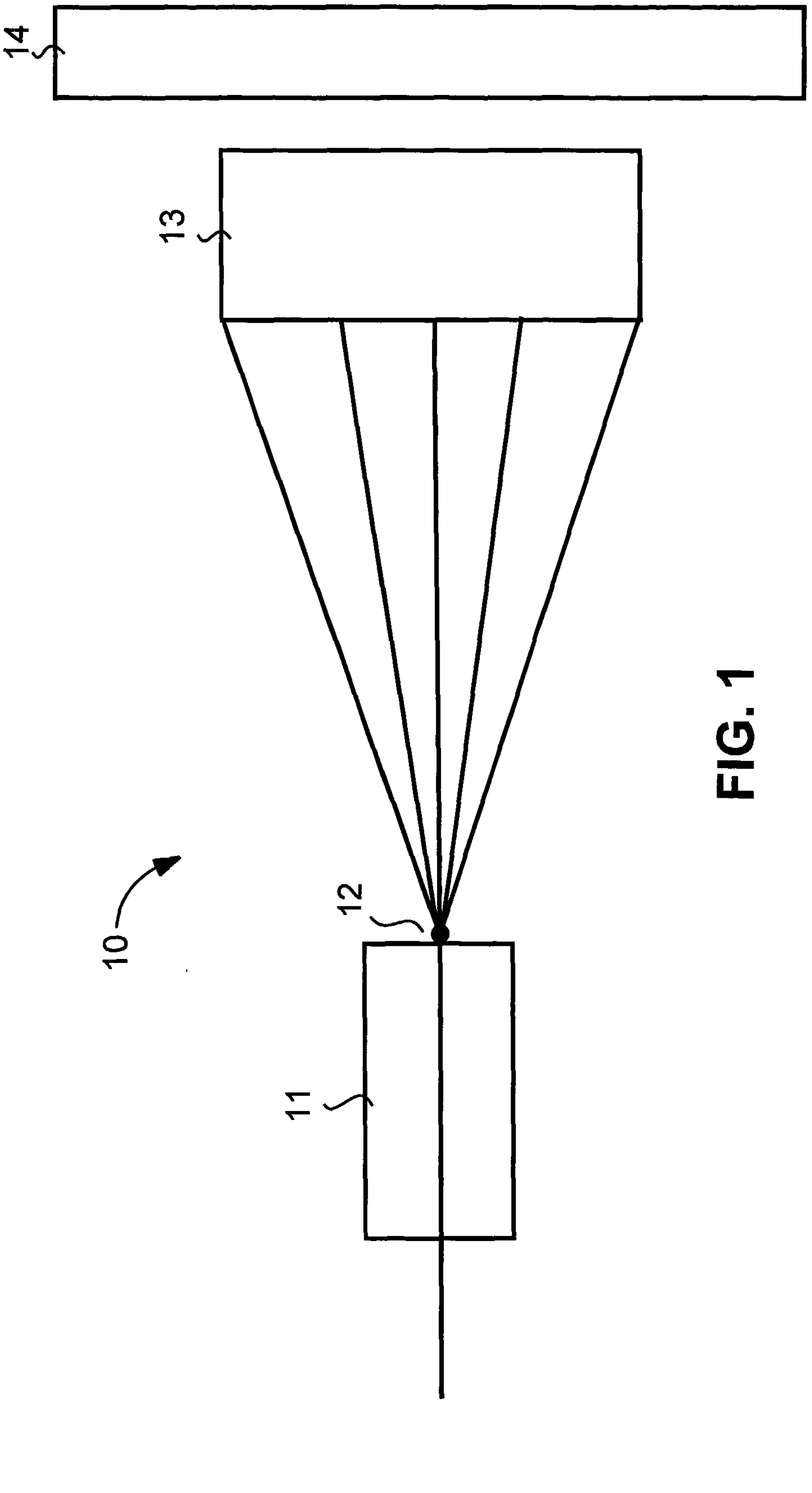
FIG. 1 is a schematic of a cargo inspection system according to the present invention.

Referring more particularly to the drawings, and initially to FIG. 1, there is shown the cargo inspection system 10 of the present invention. The cargo inspection system 10 comprises an electron accelerator 11, providing a source of electrons which impact a bremsstrahlung target 12 of material having a high atomic number, such as tungsten or tantalum, causing generation of a beam of bremsstrahlung X-ray radiation. The object 13 to be scanned, such as a cargo container, moves between the bremsstrahlung source 12 and a detector 14. Radiation transmitted through the object 13 is absorbed or scattered to varying degrees by the object and its contents, and the attenuation is sensed by the detector 14. The different dependence of the X-ray absorption/scattering cross-section on energy for different elements is the basis for recognition of the light or heavy elements content anomaly, e.g., nitrogen in explosives or plutonium in fissionable materials.

Figure 2:
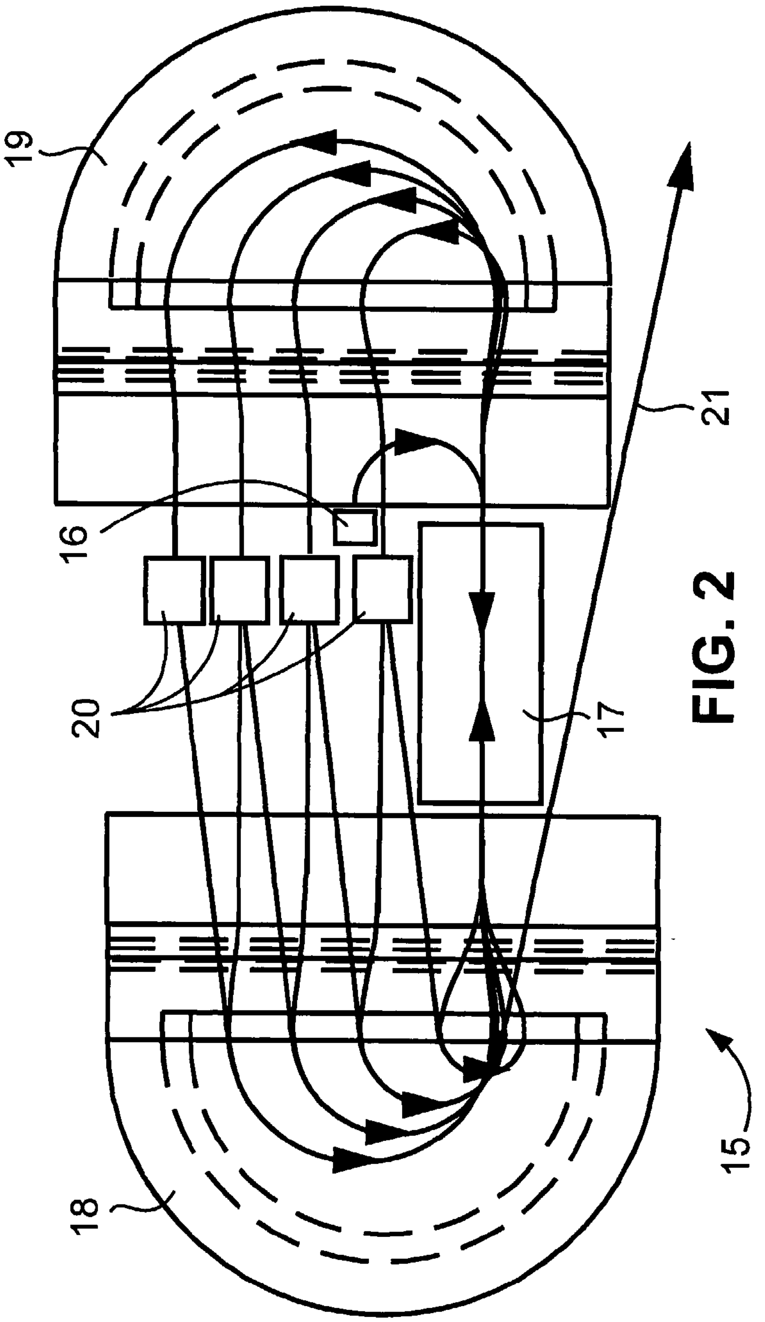
FIG. 2 is a schematic view of the electronic accelerator used in the cargo inspection system of FIG. 1.

The electron accelerator 11, which is shown schematically in more detail in FIG. 2, is a compact 10-MeV race-track microtron (RTM) 15. The RTM 15 comprises an electron gun 16 providing an electron beam, a linear accelerator (linac) 17 through which the beam is accelerated, and a pair of end magnets 18 and 19 which deflect the beam back through the linac several times. The RTM also has a plurality of fast kicker magnets 20.

In the operation of the RTM 15, the electron gun 16 produces an electron beam with a maximum energy of 10 MeV. The beam from the gun 16 enters the electron linac 17 where it is accelerated. After emerging from the linac 17, the beam deflected by the end magnet 18 so that it is directed back through the linac 17. It comes out of the linac 17 and is deflected by another end magnet 19 to one of a plurality of fast kicker magnets 20. From the fast kicker magnet 20, the beam is directed back to the end magnet 18 from which it repeats its path through the linac 17 and back to the end magnet 19 correcting dipoles RTM operation is provided by suitable RF, vacuum, high voltage, cooling and control systems.

The physical and operational parameters of the RTM are as follows:

| | |
|---|---|
| Beam energies | 4, 6, 8, 10 MeV |
| Operating frequency | 2856 MHz |
| Synchronous energy gain | 2 MeV |
| End magnets field | 0.4 T |
| Injection energy | 40 keV |
| Pulsed RF power | 1600 kW |
| Average beam current | up to 100 μA |
| Repetition rate | up to 1000 Hz |
| RTM dimensions | 750 250 140 mm |
| RTM weight | <60 kg |

The RTM of the present invention combines advantages of the linacs and cyclic accelerators. The RTM produces an electron beam with high intensity, a narrow spectrum, and precisely fixed energies. It uses less power in a more compact and less weight installation compared with prior art machines. A major advantage of this accelerator for application in cargo inspection systems is its capability to change extracted beam energy with a fixed step in each operational cycle, which can follow with as high a repetition frequency as 1000 Hz, preserving beam quality.

The RTM is a combination of electron linac 17 and bending magnets 18 and 19 configured such that an electron beam can be accelerated several times in the same linac. With N beam passages through the linac to get the same energy, its length and RF power necessary to produce an accelerating field are decreased N times compared with just one linac. As a result, the RTM is more compact, less costly and more efficient compared with a linac alone. Use of an RTM is limited by current instabilities when generating a high average power beam (several kW and more), but the RTM is best suitable for low and moderate average beam power applications of which a cargo inspection system is a prime example.

The RTM of the present invention is compact because of (a) the injection method which does not require special injection and compensation dipoles and so decreases the distance between end magnets by about two times; (b) the accelerating structure with RF focusing in both transverse planes, which simplifies RTM optics and decreases longitudinal dimensions by 20 to 30%; (c) the end magnets built with rare earth permanent magnet (REPM) material, decreasing magnets volume by 2 to 3 times. The RTM of the present invention is low weight because of (a) the accelerating structure which produces only 2 MeV energy gain per pass and so is 5 to 6 times lighter as compared to a 10 MeV linac accelerating structure; (b) the pulsed RTM RF power feeding RTM which is 3 to 4 times less than for a 10 MeV linac, and accordingly the RF source and modulator weight are lower; and (c) the end magnets which are built with REPM material that is approximately 50% lighter than an electromagnet.

To simplify the accelerator engineering design, decreasing its weight and dimensions, RTM elements are placed on a precisely machined platform, and the whole accelerator is put in a vacuum box with internal dimensions of approximately 750 mm 250 mm 140 mm pumped by the turbomolecular pump. The total weight of the main RTM elements—the end magnets, linac and platform—does not exceed 60 kg.

Extracted beam energy change in each operational cycle is reached by the fast kicker magnets 20 installed at each orbit, and their excitation according to the irradiation program is synchronized with RTM RF system operation. To keep small electron beam dimensions at the bremsstrahlung target, pulsed quadrupoles are used.

The RTM of the present invention provides significant size and weight advantages over the prior art. All pulsed RTMs built until now (except, perhaps, first proofing principle laboratory installations) operate in the energy range of 50 to 150 MeV. Circular microtrons, for which approximately 9 to 10 MeV is the standard energy, are huge compared with the RTM the present invention and do not permit fast change of extracted beam energy. Electron linacs are available with regulated output energy; however, this regulation is reached by RF source power change, beam loading change or coupling cells detuning in standing wave structures, or, in the case of multisection linacs, RF power/phase variation. In no one instance can beam quality or energy switching speed be compared to the RTM of the present invention.

Compared with the Linatron-M discussed above in which the volume occupied by the accelerating head was 273 $m^3$, the RTM of the present invention has a corresponding volume of 1.4 m 2.5 m 7.7 m=27 $m^3$, about 10 times less, and the Linatron-M is about two and half times heavier. The Linatron-M producing a 9 MeV beam requires about 5 MW klystron, while for the accelerator of the present invention only a 1.6 MW klystron is necessary, so the RF, cooling systems, and modulator will be accordingly smaller and lighter.

Thus, the present invention provides a 10 MeV electron accelerator for use in cargo inspection systems that is more compact, about three times less weight and about three times more efficient in comparison with linacs currently in use. Its beam energy is variable in the range 4 to 10 MeV with step 2 MeV and 1000 Hz repetition frequency, which permits the performance of the multi-energy technique for cargo inspection which is sensitive to the elemental composition of the inspected object.

The cost of currently available linacs with 10 MeV beam energy, including all systems (RF, modulator, cooling, control) is in the range $1 to 3 million, depending on manufacturer. Cost of the RTM of the present invention with all its systems should be significantly less. RTM can replace several, up to four, linacs in multi-energy technique, so the cost reduction compared to an equivalent linac-based system can be about 10 times.

Theory of Operation

Figure 3:
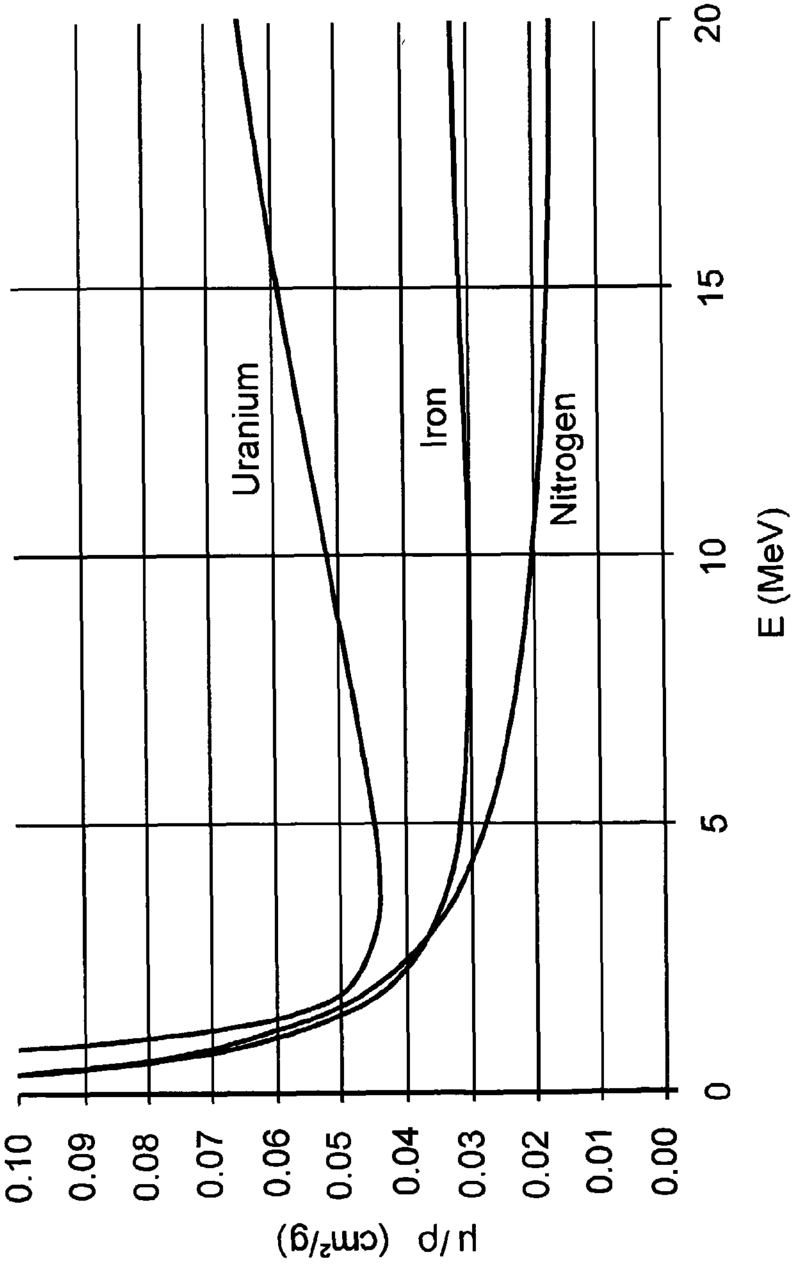
FIG. 3 is a graph which shows mass attenuation coefficient with energy for N, Fe, and U.

To recognize contraband materials concealed in cargo, a response must be obtained to an exposure signal uniquely connected with these specific materials. Probing the nuclei by external radiation is one way to get "fingerprints" of specific materials. However, with nuclear methods, the container content cannot be visualized, and residual radioactivity is possible. So, extending the capabilities of standard cargo inspection systems based on 2 to 10 MeV electron accelerators as X-ray sources is highly desirable. With an X-ray spectrum produced by electrons having energy less than 10 MeV, the energy level is below threshold of photonuclear reactions for most nuclei and so detection must rely upon atomic processes as a unique label of specific materials. This has been previously accomplished with a dual energy method in an energy range of 50 to 200 keV, and more recently this method has been applied to the higher range of 4 to 9 MeV. Different dependence of the X-ray absorption cross-section on energy for different elements is the basis for recognition of the light or heavy elements content anomaly. FIG. 3 shows energy dependence of mass attenuation coefficient, $\mu/\rho$, where $\mu$ is attenuation coefficient and $\rho$ is the material density, for nitrogen, iron and uranium in the energy range of 1 to 20 MeV. Pair production process is mainly responsible for the different dependence of attenuation coefficient on energy above approximately 1 MeV, i.e. decaying with energy for nitrogen and growing for uranium.

Figure 4:
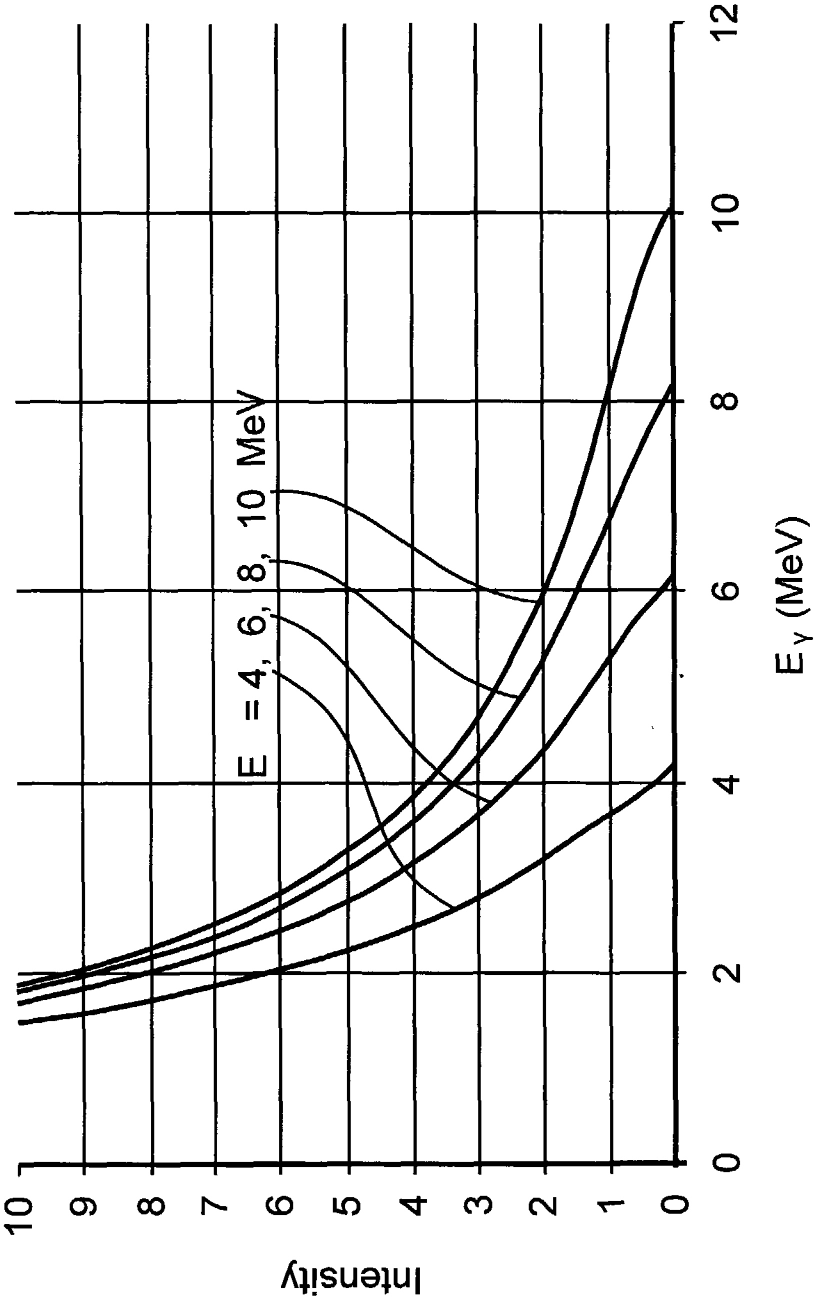
FIG. 4 is a graph which shows bremsstrahlung spectra for electron energies 4, 6, 8 and 10 MeV.

If there were a monochromatic X-ray source with energy variable with high repetition frequency in the range 1 to 10 MeV, just the attenuation coefficient dependence on energy could be measured at each irradiated cargo position, and, with probability defined by statistical errors, the effective atomic number distribution over the container could be estimated. However, such a source is not available, so detection must use bremsstrahlung radiation with continuous spectra, as shown in FIG. 4 for different electron energies impinging upon the bremsstrahlung target. The maximum or end-point energy of the bremsstrahlung spectrum is equal to the electron energy.

Figure 5:
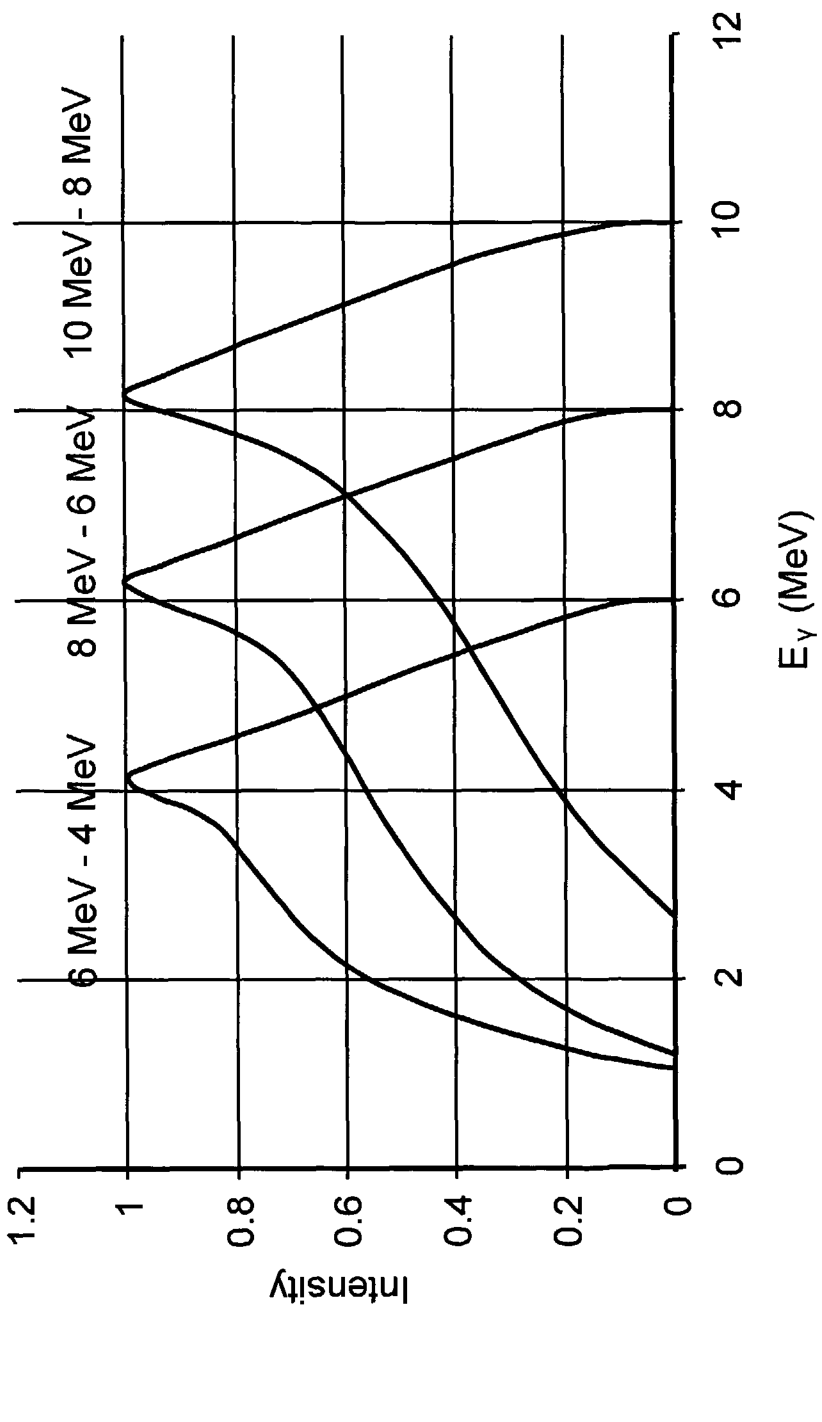
FIG. 5 is a graph which shows quasimonochromatic difference bremsstrahlung spectra.

A similar problem, obtaining cross section energy dependence using continuous bremsstrahlung spectra, has been well known for some time in photonuclear reactions studies, and it is resolved by taking the difference of reaction yields measured at different end-point energies. In essence, this technique is equivalent to use of the quasimonochromatic X-ray spectra shown in FIG. 5. The maximum of the quasimonochromatic spectrum is positioned at effective energy equal to the end-point energy of the subtracted spectrum.

Thus, it is apparent that using only two electron energies in the dual-energy method is equivalent to the estimation of the attenuation coefficient only at one effective energy. Because of an unknown effective thickness of material, $t_{eff}$, which together with the attenuation coefficient defines the X-ray flux attenuation: $I=I_0 \exp(-\mu_{eff} t_{eff})$, dual-energy technique capabilities in material recognition are limited.

Figure 6:
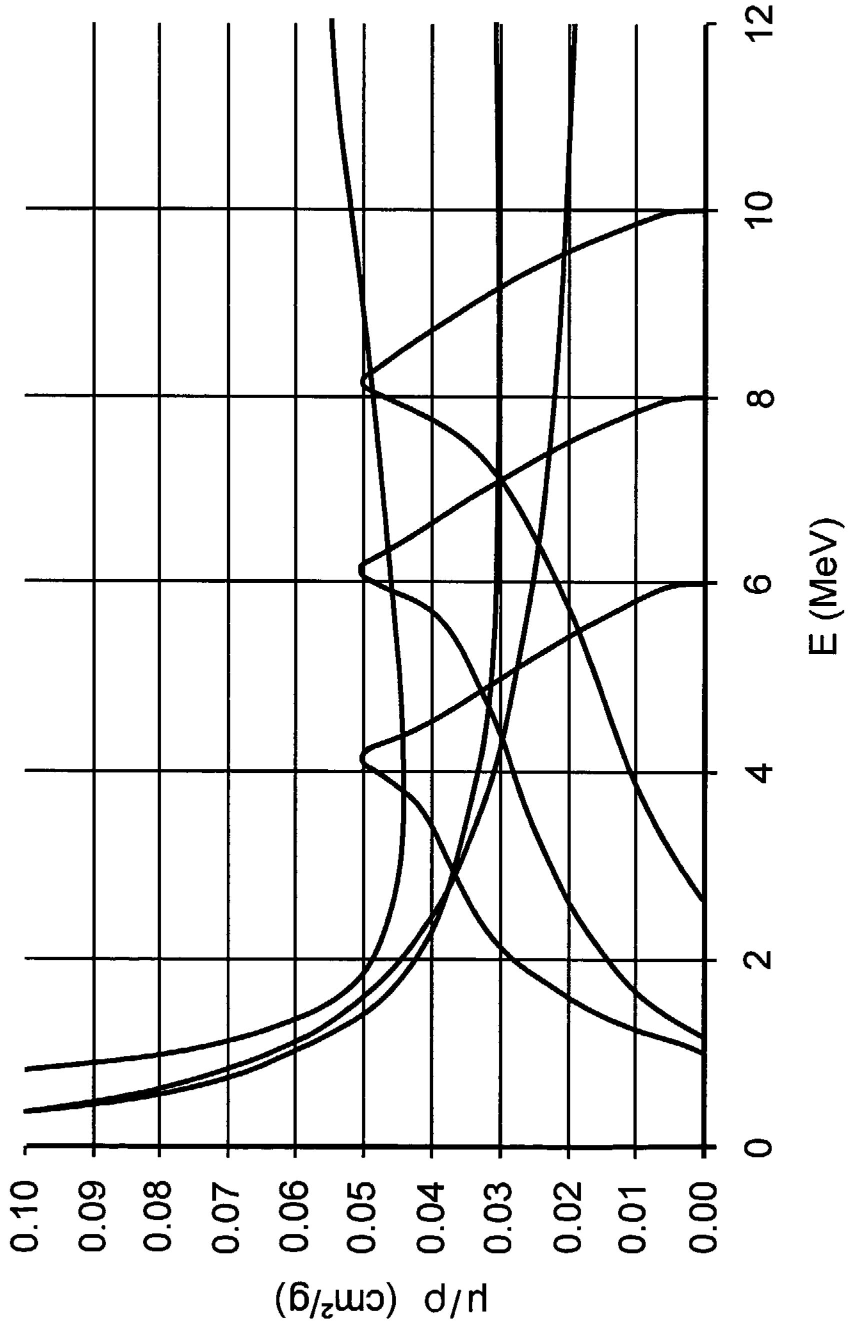
FIG. 6 is a graph which shows attenuation measurement with quasimonochromatic spectra.

Capabilities are increased, however, by using several electron energies for producing bremsstrahlung radiation illuminating the same container area. For four electron energies, by taking the difference, the attenuation product $\mu_{eff}t_{eff}$ can be estimated at three effective X-rays energies (FIG. 6), and, assuming constant effective thickness, the relative dependence of $\mu_{eff}$ on energy can be obtained. Using the present invention, extensive computer simulation with GEANT code is conducted to elaborate details of the multiple-energy technique for material recognition and to produce high productivity software for raw detector information development.

Using the present invention of a multiple-energy technique for material recognition in cargo inspection system equipped with the multi-energy electron accelerator, two to three times improvement in material recognition capabilities can be achieved as compared with dual-energy technique because of the possibility to get the energy dependence of the effective material attenuation coefficient. As high as 1000 Hz repletion frequency of the pulsed beam of the present invention allows simultaneously a 20 to 30% increase in productivity of the cargo inspection system.

While the invention has been described with reference to inspection of large objects such as cargo containers, the multiple-energy technique is also applicable to low energy (50-200 KeV) energy range in which small and medium size objects can be inspected.

Figure 7:
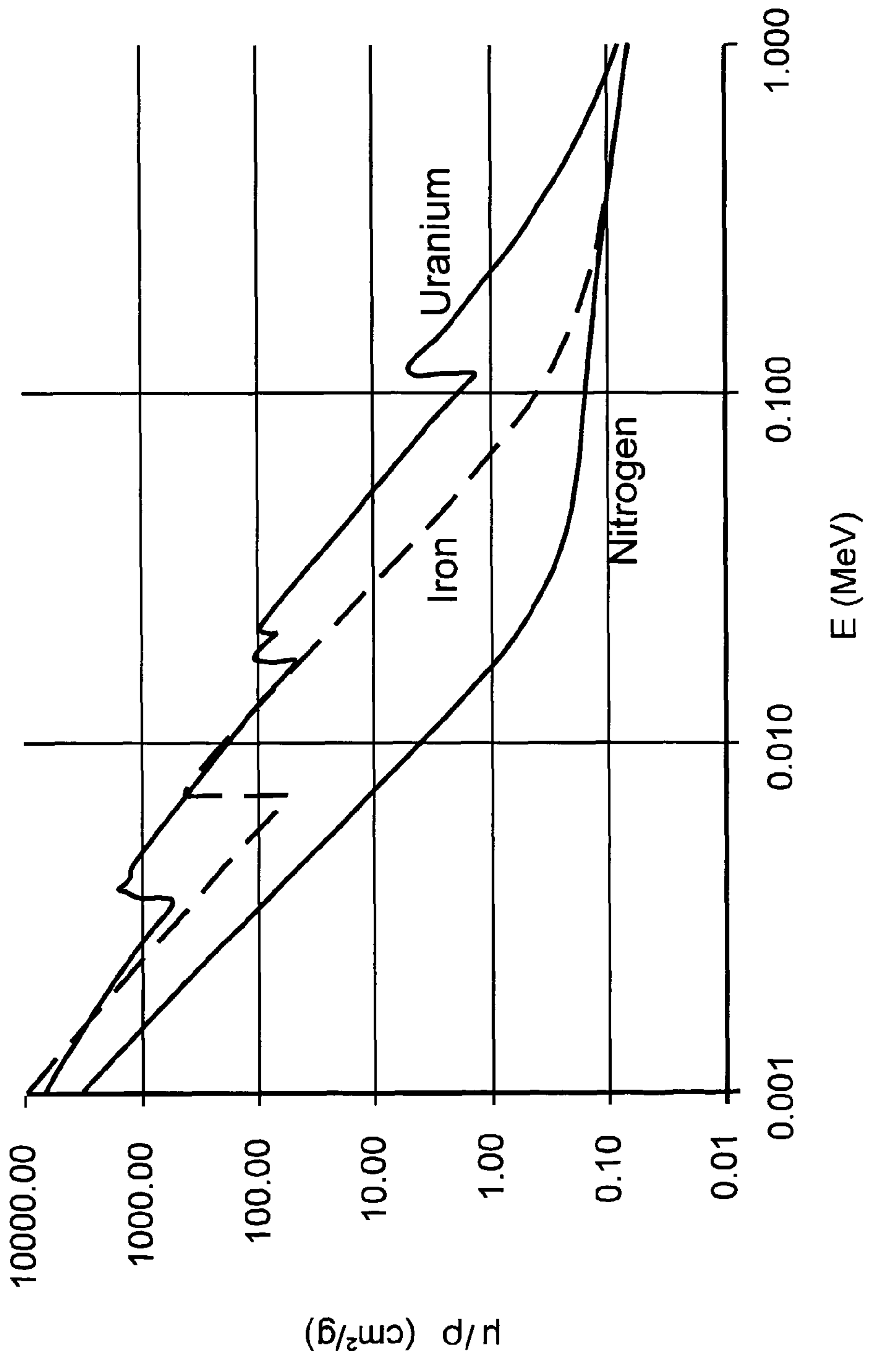
FIG. 7 is a graph showing mass attenuation coefficient with energy for N, Fe, and U.

FIG. 7 shows the energy dependence of the mass attenuation coefficient, $\mu/\rho$, where $\mu$ is the attenuation coefficient and $\rho$ is the material density, for nitrogen, iron and uranium in an energy range of 1 to 1000 keV. In this energy range, photoelectric interaction is mainly responsible for X-rays attenuation, producing a strong dependence of the mass attenuation coefficient on the atomic number Z. This strong dependence on Z is the basis for the success of the dual energy method in material recognition for small and medium size objects. Especially important for an accurate recognition of heavy elements are the absorption peaks seen in the attenuation coefficient and connected with excitation of specific atomic shells. Additional improvement comes from much better possibilities for bremsstrahlung spectra filtering at low energies, which permits modification of essentially spectrum form.

It is thus apparent that using quasimonochromatic X-ray spectra leads to improved capabilities for material recognition and to a decrease in the number of false alarm signals. The same bremmstrahlung difference spectra technique previously described can be applied in this energy range. However, producing low energy, 50 to 200 keV, electron beam with the race-track microtron 10 may be economically and technically unjustified, and the same technique for electron beam generation as in dual energy method can be used. Alternatively, the appropriate lower energy electron beam can be produced using quasimonochromatic X-ray radiation produced by Compton scattering of an intense laser beam on relativistic electrons.

It should be realized that the embodiment described herein is only representative of the invention and is not intended to limit the invention to one particular embodiment as the invention includes all embodiments falling within the scope of the appended claims. Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A cargo inspection system which comprises a compact multi-energy electron accelerator comprising a race-track microtron having a maximum electron energy of 10 MeV.

2. The cargo inspection system of claim 1, wherein the electron accelerator generates electron beams of at least three different exit electron energies.

3. The cargo inspection system of claim 2, wherein the electron accelerator generates electron beams of four different exit electron energies, each of which is no greater than 10 MeV.

4. The cargo inspection system of claim 1, wherein the microtron includes an electron gun that injects the electron beam directly into a linear accelerator without the use of compensation dipoles.

5. The cargo inspection system of claim 1, wherein the microtron comprises an electron gun which creates an electron beam, a linear accelerator through which the beam is accelerated, and a pair of end magnets which deflect the beam back through the linear accelerator several times.

6. The cargo inspection system of claim 1, wherein the microtron includes end magnets made of rare earth permanent magnet material.

7. The cargo inspection system of claim 1, comprising in addition a bremsstrahlung target at which the electron beam from the microtron is directed generating bremsstrahlung radiation in response thereto, and a detector which senses attenuation of radiation from an object.

8. The cargo inspection system of claim 1, wherein the microtron is substantially no more than 1 meter in length.

9. The cargo inspection system of claim 1, wherein the microtron is substantially no heavier than 60 kg.

* * * * *